United States Patent
Marason et al.

(10) Patent No.: US 9,971,151 B1
(45) Date of Patent: May 15, 2018

(54) MOUNTABLE CLEAR DISPLAYS AND PROJECTION SYSTEMS

(71) Applicant: Amazon Technologies, Inc., Seattle, WA (US)

(72) Inventors: Eric Gifford Marason, San Francisco, CA (US); Robert Arthur Sprague, Saratoga, CA (US); Suchit Shreyas Shah, San Jose, CA (US); Omar Sze Leung, Palo Alto, CA (US); Miguel Virgen, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 29 days.

(21) Appl. No.: 15/181,077

(22) Filed: Jun. 13, 2016

(51) Int. Cl.
| | |
|---|---|
| *G03B 21/56* | (2006.01) |
| *G02F 1/1335* | (2006.01) |
| *G02B 27/01* | (2006.01) |
| *G03B 33/12* | (2006.01) |
| *G03B 21/20* | (2006.01) |
| *G02B 5/20* | (2006.01) |

(52) U.S. Cl.
CPC ... *G02B 27/0101* (2013.01); *G02F 1/133528* (2013.01); *G03B 21/2033* (2013.01); *G03B 21/567* (2013.01); *G03B 33/12* (2013.01); *G02B 5/208* (2013.01); *G02B 2027/0112* (2013.01); *G02F 2001/133614* (2013.01)

(58) Field of Classification Search
CPC ...... G03B 21/567; G03B 21/60; G03B 21/56; G02F 2001/133614
USPC .................................................. 359/452, 443
See application file for complete search history.

(56) References Cited

U.S. PATENT DOCUMENTS

| | | |
|---|---|---|
| 7,511,771 B2 | 3/2009 | Stern et al. |
| 9,133,990 B2 | 9/2015 | Lee et al. |
| 2008/0018558 A1* | 1/2008 | Kykta .................. G03B 21/567 345/58 |

OTHER PUBLICATIONS

Sun Innovations, "www.sun-innovations.com/" as accessed Jun. 9, 2016.

* cited by examiner

*Primary Examiner* — Ryan Howard
(74) *Attorney, Agent, or Firm* — Eversheds Sutherland (US) LLP

(57) ABSTRACT

Systems, methods, and computer-readable media are disclosed for mountable clear displays and projection systems. In one embodiment, a system may include a mirror surface and a transparent display sheet adhered to the mirror surface. The transparent display sheet may include a blue phosphor layer that absorbs light having the first wavelength and emits light having a fourth wavelength of about 460 nm, a green phosphor layer that absorbs light having the second wavelength and emits light having a fifth wavelength of about 530 nm, a red phosphor layer that absorbs light having the third wavelength and emits light having a sixth wavelength of about 625 nm, and a blue light blocking layer attached to the red phosphor layer of the transparent display sheet, the blue light blocking layer configured to absorb blue light passing through the transparent display sheet.

20 Claims, 9 Drawing Sheets

MOUNTABLE CLEAR DISPLAYS AND PROJECTION SYSTEMS

BACKGROUND

Electronic display devices may be used to provide information and content to users. However, in certain areas, providing electronic display devices may be difficult or undesirable due to the size and unaesthetic appearance of some electronic display devices. For example, positioning an electronic display device in front of a window may block a view through the window. Similarly, providing an electronic display device in front of a mirror may render the mirror unusable for users. Users may desire, however, to consume content from electronic displays positioned in such locations.

Figure 1:
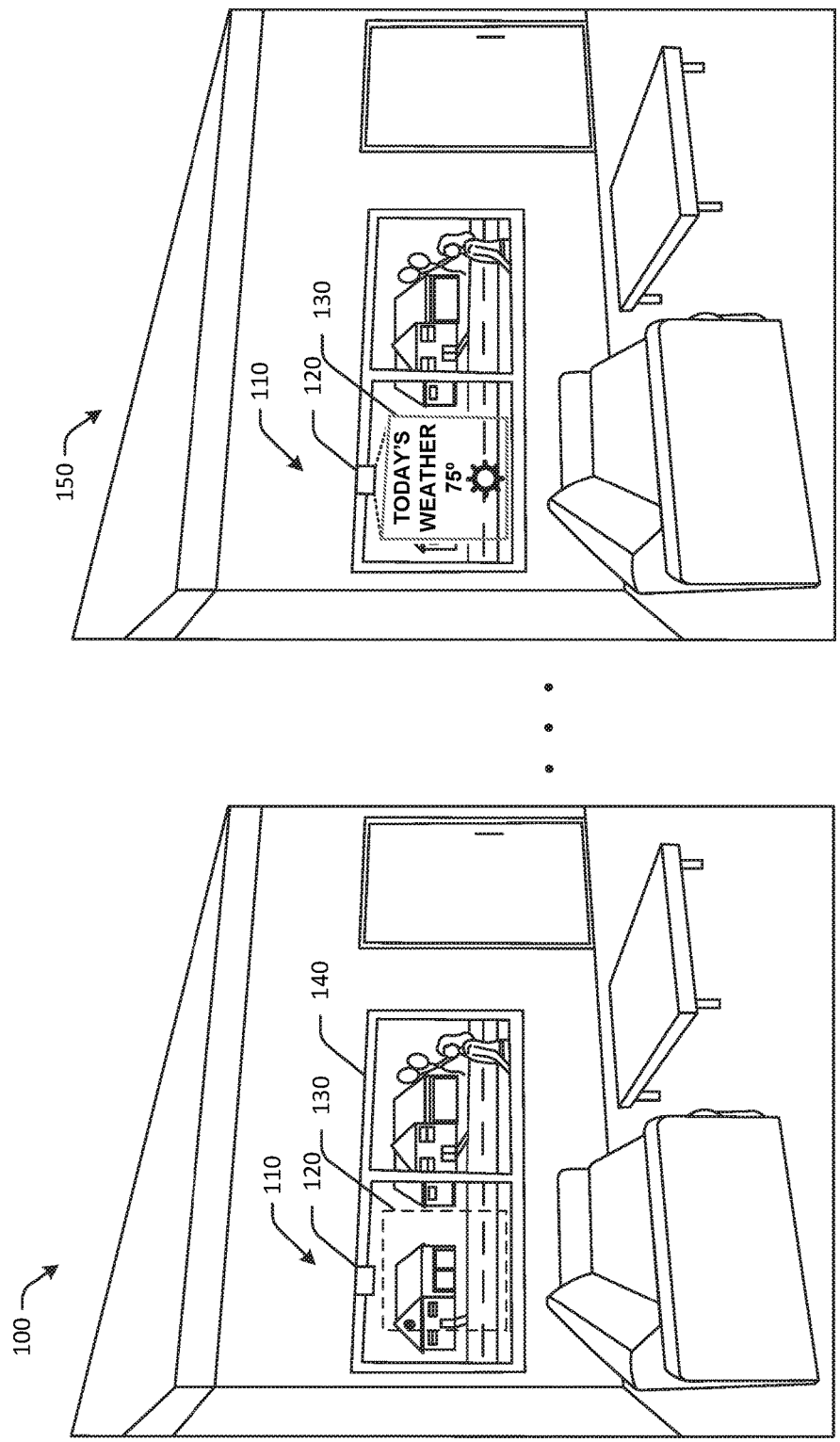
FIG. 1 is a schematic illustration of an example use case of a window-mounted clear display and projection system in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

This disclosure relates to, among other things, systems, methods, computer-readable media, techniques, and methodologies for providing mountable clear displays and projection systems. Embodiments of the disclosure may include clear or transparent displays that may be used with a projector to present content, such as text, images, or videos, on the clear or transparent displays. In some embodiments, clear or transparent displays may be mounted on surfaces such as glass windows, mirrors, walls, or other surfaces, such that while the projection system is not in operation, users can see through the clear or transparent display. As a result, users may utilize the surfaces adjacent to the clear or transparent display without any, or with minimal, obstruction. Upon activation of the projection systems described herein, surfaces on which the clear or transparent displays are mounted may be used to present content from a projector, thereby providing additional functionality without impacting underlying surfaces. Embodiments of the disclosure may therefore provide electronic displays that present content, such as text, images, videos, and the like, from a projector when activated. When inactivated, the clear or transparent displays of the disclosure may be barely visible or visually undiscernible, allowing users to see through the clear or transparent displays, and not interrupting sightlines or views. For example, clear displays may be mounted on windows or mirrors, and when not activated, users may see through the clear displays and through the windows, or view a reflection in a mirror. Embodiments of the disclosure may provide functionality without impacting functionality or aesthetic appearance of underlying surfaces. Accordingly, projection systems as described herein may present content in locations that electronic display devices may not suited for.

Embodiments of the disclosure may include projection systems with projectors and clear displays. Projectors of the projection systems may be short throw projectors configured to emit one or more wavelengths of light using light emitting diodes. In some embodiments, the projector may be a digital light processing (DLP) projector, such as a pico DLP projector. Projectors, as described herein, may include one or more light emitting diode light sources and DLP imaging technology, so as to provide compact and battery operable functionality. The light emitting diodes may include one or more of the following colors: violet, indigo, blue, green, red, ultraviolet, or another color. In some embodiments, three of the light emitting diodes may be used at a time. For example, violet, indigo, and blue light emitting diodes may be used together in some instances, while in other instances, ultraviolet, indigo, and blue light emitting diodes may be used together, to project light onto a number of different surfaces, such as transparent surfaces or clear displays.

Referring to FIG. 1, an example mountable clear display and projection system in an inactive state is depicted in accordance with one or more embodiments of the disclosure. In FIG. 1, an example projection system 110 including a projector 120 and a clear display 130 is illustrated in an inactive state 100. The clear display 130 may be mounted on a window surface 140. The window surface 140 may be glass, plastic, or any other window surface. The clear display 130 may be mounted via an adhesive, static, tape, a liquid optically clear adhesive, or another coupling method to mount the clear display 130 to the window surface 140.

In the inactive state 100, the clear display 130 may appear transparent or see-through, allowing users to visually see through the clear display 130 and into the outside environment. The clear display 130 may be formed of plastic, such as polyethylene naphthalate, polyethylene terephthalate, or another suitable clear plastic, glass, or other clear material.

The clear display 130 may be positioned adjacent to the projector 120. In FIG. 1, the clear display 130 is mounted underneath the projector 120 on the window surface 140. The clear display 130 may be removably mounted to any suitable surface, such as a window, a mirror, a wall, or another surface. The projector 120 may be mounted to the window surface 140, to a window frame surrounding the window surface 140, to a wall, or at another surface. In some embodiments, the projector 120 may be mounted relatively close to the clear display 130, such as about 2 inches or up to 4 inches away from the clear display 140, while in other embodiments, the projector 120 may be mounted relatively far from the clear display 130, such as at a ceiling or opposing wall.

The projector 120 may project light onto the clear display 130 to present content such as text, images, video, and other content. For example, the projection system 110 is illustrated in an active state 150 in FIG. 1. In the active state 150, the projector 120 may project light onto the clear display 130, thereby rendering content on the clear display 130. For example, as shown in FIG. 1, the clear display 130 may present content such as current weather information, illustrated as "TODAY'S WEATHER 75°" with a sunny emoticon. In some embodiments, when the projection system 110 is in the active state 150, the clear display 130 may include one or more pixels that can be charged to present a white or black background, thereby improving contrast. In other embodiments, the clear display 130 may not include any background color functionality and/or may simply react to light from the projector 120. In the example of FIG. 1, the text portion of the clear display 130 may be rendered with a white background to improve readability, while the emoticon portion may be rendered with a clear background, allowing users to see through the emotion portion of the clear display 130. Accordingly, in certain embodiments, the clear display 130 may be passive, while in other embodiments, the clear display 130 may be actively operated.

To project content, the projector 120 may receive content, for example from a wirelessly connected server or device. The projector 120 may render the content using one or more light emitting diodes, such as violet and/or blue light emitting diodes. In some embodiments, the projector 120 may include a violet light emitting diode, an indigo light emitting diode, a blue light emitting diode, and an optional ultraviolet light emitting diode. The violet light emitting diode may emit light at a wavelength of about 405 nanometers (nm), the indigo light emitting diode may emit light at a wavelength of about 405 nm or about 425 nm, or any wavelength in between 405 nm and 425 nm, and the blue light emitting diode may emit light at a wavelength of about 425 nm or about 450 nm, or any wavelength in between 425 nm and 450 nm. The optional ultraviolet light emitting diode may emit light at a wavelength of about 380 nm.

In other embodiments, the projector 120 may include an ultraviolet light emitting diode, an indigo light emitting diode, a blue light emitting diode, and an optional violet light emitting diode. The ultraviolet light emitting diode may emit light at a wavelength of about 380 nm, the indigo light emitting diode may emit light at a wavelength of about 405 nm, the blue light emitting diode may emit light at a wavelength of about 425 nm, and the optional violet light emitting diode may emit light at a wavelength of about 425 nm. Certain embodiments may include additional or fewer light emitting diodes of different colors and/or wavelengths.

The projector 120 may project content using the light emitting diodes available at the projector 120. In some embodiments, the projector 120 may include a battery power source, such as a rechargeable battery, and may include a motion sensor that activates the projector 120 upon detecting motion.

Light from the projector 120 may be projected onto the clear display 130. The projected light may be projected at an angle from the projector 120 with respect to the clear display 130. For example, the projected light may be projected at a central image angle or grazing angle of about 70°. The grazing angle and distance between the projector 120 and the clear display 130 may affect a keystone distortion of content projected onto the clear display 120.

The clear display 130 may be optically clear or transparent, and may allow certain wavelengths of light to pass through the clear display uninterrupted or relatively uninterrupted. The clear displays may be formed of a display stack including one or more phosphor sheets. The phosphor sheets may be transparent, optically clear, or relatively optically clear. The phosphor sheet may be formed of one or more phosphor layers, and may have a thickness of about 150 microns, depending on a number of phosphor layers. Phosphor layers may be plastic layers with phosphors or phosphorus material, such as phosphor dust, suspended within the plastic, such as in a plastic matrix. The phosphor layers may be configured to absorb various wavelengths of light. Phosphor layers may have a thickness of about 50 microns. The clear display 130 may be optically clear until activated by light from the projector 120.

In some embodiments, the clear display 130 may include a blue phosphor layer, or a first phosphor layer, a green phosphor layer, or a second phosphor layer, and a red phosphor layer, or a third phosphor layer. In an example embodiment, the blue phosphor layer may have a 405 nm (violet) excitation and 460 nm (blue-green) emission, the green phosphor layer may have a 425 nm (indigo) excitation and 520 nm (green) emission, and the red phosphor layer may have a 450 nm (blue) excitation and 625 nm (red) emission. Some embodiments may include additional, fewer, or different phosphors and/or phosphor layers. The phosphor sheet and/or the clear display 130 may be laminated or coupled using an adhesive, such as a liquid optically clear adhesive, or another suitable coupling method.

The one or more phosphor layers forming the phosphor sheet of the clear display 130 may be in any order. In some embodiments, an order of the phosphor layers may be determined based at least in part on the light emitting diodes included at the projector 130. For example, if the projector 120 uses violet, indigo, and blue light emitting diodes to project light, the clear display 130 may include a green phosphor layer, a blue phosphor layer, and a red phosphor layer, where the blue phosphor layer is positioned in between the green phosphor layer and the red phosphor layer. The green phosphor layer may form an outer layer of the display stack so as to avoid cross excitation from blue phosphor layer. However, in other embodiments, such as where the projector 120 uses ultraviolet, indigo, and blue light emitting diodes to project light, the order of the phosphor layers may be in any order. Ordering of phosphor layers may also be impacted by the surface at which the clear display is mounted. For example, in instances where the clear display is mounted on a window glass surface, as in FIG. 1, the green phosphor layer may form an outermost layer of the phosphor sheet, such that light from the projector passes through the green phosphor layer before passing through the other phosphor layers.

In the active state 150, the projector 120 may project light onto the clear display 130. The projected light may excite phosphors in the phosphor sheet of the clear display 130 to produce a full color video display. The projector 120 casts projected light onto the clear display 130 at a central image angle or grazing angle of about 70°, thereby exciting full color content presentation at the clear display 130. When the clear display 130 is projected upon by the projector 120, a full color red-green-blue image or other color content may appear on the clear display 130.

In certain embodiments, the clear display 130 may include additional components, which may depend on a location and/or positioning of the clear display 130. For example, in FIG. 1, because the clear display 130 is mounted at the window surface 140, sunlight or other ambient light may affect readability or visibility of content presented at the clear display 130. Accordingly, the clear display 130 may include one or more polarizers to guide light and improve visibility. For example, the clear display 130 may include a first polarizer film, a second polarizer film, a liquid crystal array positioned between the first polarizer film and the second polarizer film, and an ultraviolet light blocking layer. The liquid crystal array may be energized to create a background color, such as a white, black, 50% translucent, or another background to improve contrast. The phosphor sheet of the clear display 130 may be coupled to the first polarizer film, and the polarizer films may be positioned in between the phosphor sheet and the window surface 140.

Because of the clear color of the clear display, embodiments of the disclosure may be used to provide electronic displays that can be used to present content at locations where electronic display devices, such as computer monitors or televisions, may have been impractical or unreasonable to position. As a result, embodiments of the disclosure may increase or otherwise improve functionality of surfaces, such as windows, mirrors, walls, and other surfaces, by allowing the surface to double as an electronic display without the use of an electronic display device, such as a television, being mounted to the surface.

Example embodiments of the disclosure relate to systems, methods, computer-readable media, techniques, and methodologies for projection systems with clear displays that allow for presentation of digital content at locations, such as windows and mirrors, that may otherwise not be suited to present content. When not in operation, embodiments of the disclosure may be unobtrusive and may be difficult to optically discern, thereby providing an aesthetically pleasing projection system while maintaining visibility of underlying surfaces.

Accordingly, the systems, methods, computer-readable media, techniques, and methodologies described herein may provide electronic displays on a number of surfaces, while preserving the ability for users to see through the clear displays mounted on surfaces. Embodiments may present or project digital content on one or more clear displays that may be mounted on surfaces that can still be seen through the clear displays.

Example embodiments of the disclosure provide a number of technical features or technical effects. For example, in accordance with example embodiments of the disclosure, certain embodiments of the disclosure may present content on a clear display. The clear display may be mounted to a surface that is still visible through the clear display, thereby providing additional functionality while preserving the ability to see through the display. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings. The techniques are described below with reference to the following devices and processes. However, a number of other devices may also employ these techniques. While FIG. 1 illustrates one example clear display, multiple other forms of display stacks, devices, and architectures may be included in other embodiments.

Illustrative Embodiments and Processes

Figure 2:
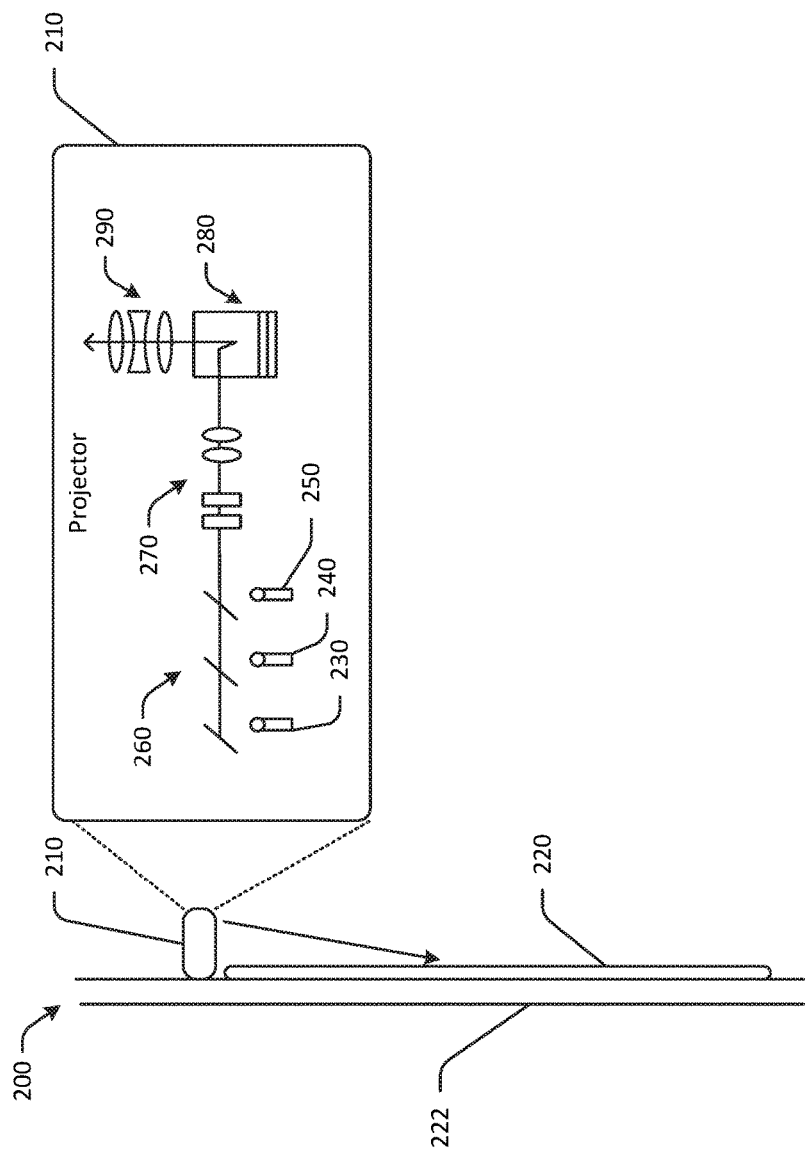
FIG. 2 is a schematic illustration of a side view of a mountable clear display and projection system in accordance with one or more embodiments of the disclosure.

FIG. 2 illustrates a side view of an example mountable clear display and projection system 200 in accordance with one or more embodiments of the disclosure. The mountable clear display and projection system 200 includes a projector 210 and a clear display 220 mounted on a glass surface 222, such as a window or a mirror. The projector 210 may be the same projector as the projector of FIG. 1. The projector 210 may be a short throw projector. A short throw projector, in one example, may be a projector with an imaging lens having a throw ratio of 0.37 distance to width ratio. The projector 210 may be a DLP projector.

The projector 210 includes one or more components as illustrated in the schematic block diagram in FIG. 2. The projector 210 may include a first light emitting diode 230, a second light emitting diode 240, and a third light emitting diode 250. The first light emitting diode 230 may be a violet light emitting diode in some embodiments, while in other embodiments the first light emitting diode 230 may be an ultraviolet light emitting diode. The second light emitting diode 240 may be an indigo light emitting diode. The third light emitting diode 250 may be a blue light emitting diode. In some embodiments, the first light emitting diode 230, the second light emitting diode 240, and the third light emitting diode 250 may be blue light emitting diodes that emit light at different wavelengths in the blue color spectrum. Some embodiments may include more than three light emitting diodes. For example, in embodiments where the first light emitting diode is a violet light emitting diode, the projector may include a fourth light emitting diode that is an ultraviolet light emitting diode. Other embodiments may include less than three light emitting diodes.

Ultraviolet light emitting diodes may emit light having a wavelength of 380 nm. Violet light emitting diodes may emit light having a wavelength of 405 nm. Indigo light emitting diodes may emit light having a wavelength of 405 nm or 425 nm, or a wavelength between 405 nm and 425 nm. Blue light emitting diodes may emit light having a wavelength of 425 mn or 450 nm, or a wavelength between 425 nm and 450 nm.

The light emitting diodes 230, 240, 250 may be configured to emit light at the respective wavelengths when activated. The light emitted may comprise photons in infrared wavelengths, visible wavelengths, ultraviolet wavelengths, or a combination thereof. Light emitted from the light emitting diodes 230, 240, 250 may pass through individual collectors or collimating lenses, and may be reflected and/or directed by one or more mirrors 260. The mirrors 260 may be dichroic filters or mirrors. In some embodiments, each light emitting diode may have a corresponding mirror 260 that reflects light emitted by the respective light emitting diode.

Light reflected by the one or more mirrors 260 may pass through an optics system 270 that may include homogenizing optics, such as a fly's eye array, and relay optics. The light may pass through a total internal reflection prism 280, which may be positioned adjacent to a digital micromirror device. The light reflected through the total internal reflection prism 280 may pass through a projection lens system 290 and out of the projector 210. The projection lens system 290 may include a projection lens that directs or guides light from the projector 210 to the clear display 220. The projection lens may control or affect a central image projection angle or grazing angle of light from the projector 210 to the clear display 220. The central image projection angle or grazing angle may be about 50°, or about 70°, or about 80°. The projection lens system 290 may include a beam splitters configured to split light having wavelengths of the light emitting diodes 230, 240, 250. The beam splitters may combine the light emitted from the various light emitting diodes 230, 240, 250 into one beam that is projected onto the surface of the DLP, and forms a three color image. In operation, light may flood the projection lens of the projector 210, and the projection lens may collect light at about 60 frames per second in one embodiment.

Figure 3:
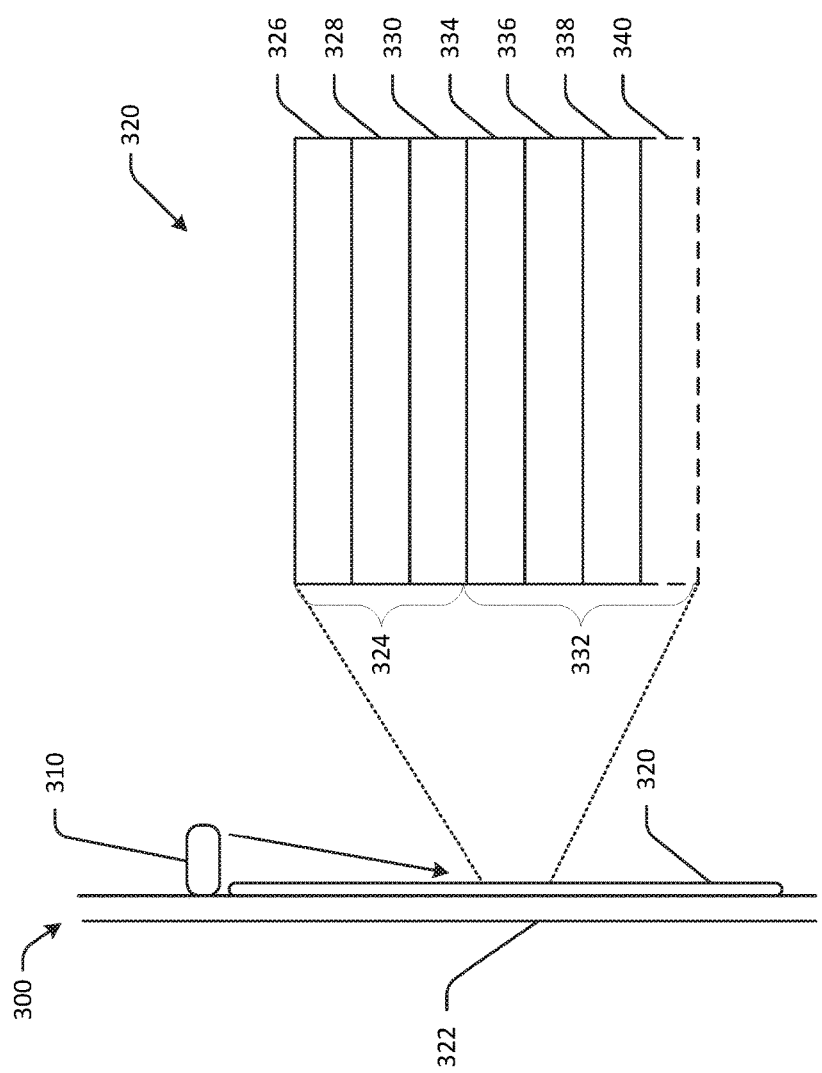
FIG. 3 is a schematic illustration of a side view of a mountable clear display and projection system in accordance with one or more embodiments of the disclosure.

FIG. 3 illustrates a side view of an example mountable clear display and projection system 300 in accordance with one or more embodiments of the disclosure. The mountable clear display and projection system 300 includes a projector 310 and a clear display 320 mounted on a glass surface 322, such as a window or a mirror. FIG. 3 illustrates the clear display 320 in detailed view. The clear display 320 may be the same clear display as FIGS. 1-2.

The clear display 320 may be transparent and may be formed of one or more layers and may include a phosphor sheet 324. The phosphor sheet 324 may include one or more phosphor layers. The phosphor layers may be formed of phosphor material, such as phosphor dust, suspended in a plastic matrix or plastic film. The phosphor layers may be laminated or otherwise coupled to each other. The short wavelength absorption properties of phosphors may result in the transparent appearance of the clear display 320.

In FIG. 3, the phosphor sheet 324 may include a first phosphor layer 326, a second phosphor layer 328, and a third phosphor layer 330. Other embodiments may include additional or fewer phosphor layers in the phosphor sheet 324. In some embodiments, the phosphor layers may be stacked in any order, while in other embodiments, the phosphor layers may be stacked in a specific order. For example, in FIG. 3, the first phosphor layer 326 may be a green phosphor layer, the second phosphor layer 328 may be a blue phosphor layer, and the third phosphor layer 330 may be a red phosphor layer. The order of the phosphor layers may be dependent on the wavelengths of the light emitting diodes used by the projector 310. For example, if the projector 310 emits light of wavelengths of violet, indigo, and blue, the green phosphor layer 326 may be positioned as an outer or upper layer of the phosphor sheet 324 so as to avoid cross excitation from the blue phosphor layer 328. The blue phosphor layer 328 may therefore be positioned in adjacent to the green phosphor layer 326 in the middle of the stack, or the red phosphor layer 330 may be positioned in the middle of the stack in the embodiment of FIG. 3. In other embodiments, the green phosphor layer may not form the outer or upper layer of the phosphor sheet 324. Certain embodiments may include phosphor sheets with phosphor layers in any order.

In some embodiments, the blue phosphor layer 328 may be configured to absorb short wavelength blue light (e.g., light having a wavelength between about 370 nm to about 399 nm, or between about 400 nm to about 415 nm, or between about 370 nm to about 415 nm), the red phosphor layer 330 may be configured to absorb medium wavelength blue light (e.g., light having a wavelength between about 416 nm to about 435 nm), and the green phosphor layer 326 may be configured to absorb long wavelength blue light (e.g., light having a wavelength between about 436 nm to about 450 nm). In certain embodiments, The blue phosphor layer 328 may be configured to absorb light having a wavelength of about 405 nm and emit light having wavelength of about 460 nm, the green phosphor layer 326 may be configured to absorb light having a wavelength of about 425 nm and emit light having a wavelength of about 530 nm, and the red phosphor layer 330 may be configured to absorb light having a wavelength of about 450 nm and emit light having a sixth wavelength of about 625 nm. In other embodiments, the blue phosphor layer 328 may be configured to absorb light having a wavelength of about 380 nm, the green phosphor layer 326 may be configured to absorb light having a wavelength of about 405 mn, and the red phosphor layer 330 may be configured to absorb light having a wavelength of about 425 nm. The blue phosphor layer 326 configured to absorb light having a wavelength of about 380 nm may result in increased optical clarity compared to a 450 nm absorbing phosphor, which can appear tinted due to absorption of non-projected ambient light.

The phosphor layers 326, 328, 330 may have the same or different thicknesses. In some embodiments, the phosphor layers 326, 328, 330 may have a thickness of about 50 microns, or about 0.002 inches. The phosphor sheet 324 may have a thickness determined by a number of phosphor layers included in the phosphor sheet 324. The phosphor sheet 324 may include phosphor layers with the same or varying thicknesses.

One or more layers of the clear display 320 may be coupled with an optically clear adhesive, such as a liquid optically clear adhesive, or with another adhesive. Optically clear adhesive may be in liquid or non-liquid form. Liquid optically clear adhesive may be liquid-based and may improve optical characteristics of the clear display 320, as well as durability. Liquid optically clear adhesives may be conformal and/or less firm than other adhesives, and may therefore bind to non-even surfaces.

In some embodiments, the clear display 320 may include only the phosphor sheet 324. In other embodiments, the clear display 330 may be coupled to one or more other display stack components to form the clear display 320. For example, in embodiments where the clear display 320 is mounted to an opaque surface, such as a painted wall, the clear display 320 may include only the phosphor sheet 324. In embodiments where the clear display 320 is mounted on a window or glass surface, such as the illustration of FIG. 3, the clear display 320 may include a polarizer stack 332 coupled to the phosphor sheet 324. The polarizer stack 332 may be formed of plastic, such as a plastic film. The polarizer stack 332 may be configured to guide light of certain wavelengths or colors of light, which may result in improved visibility, readability, or contrast of content presented at the clear display 320.

The polarizer stack 332 may include a first polarizer film 334, a liquid crystal array 336, a second polarizer film 338, and an optional ultraviolet light blocking layer 340. The first polarizer film 334 and the second polarizer film 338 may be positioned about opposite sides of the liquid crystal array 336, and may guide light of the same wavelengths or light of different wavelengths. The liquid crystal array 336 may be, in some embodiments, a single pixel that reacts to voltage, for example, by appearing black, white, or a degree of translucence. Other embodiments may include more than one pixel in the liquid crystal array 336. The optional ultraviolet light blocking layer 340 may block or absorb ultraviolet light, such as ultraviolet light streaming through the window surface 322 (e.g., sunlight, etc.), to improve visibility of content presented at the clear display 320. Other embodiments may include different components, such as a blue light absorbing layer coupled to the phosphor sheet 324 that absorbs escaped blue light from the blue phosphor layer 328. The blue light absorbing layer may be used in embodiments where the clear display 320 is mounted on a mirror surface, so as to prevent re-excitation and image blur.

In some embodiments, the clear display 320 may include a cover layer or a cover film that may be optically clear. The cover layer may be formed from plastic or glass, for example, and may form an outer or outermost layer of the clear display 320. In certain embodiments, the clear display 320 may include one or more touch layers with one or more resistive and/or capacitive touch sensors, thereby allowing the clear display 320 to receive touch input. Users may therefore make selections or provide inputs via the one or more touch layers. In some embodiments, one or more layers of the clear display 320 may include surface features, such as diffusers, grooves, grating, dimples, lenses, planar surfaces, concave surfaces, convex surfaces, and so forth, which may be used to enhance or attenuate the transmission of light.

The projector 310 may be positioned so as to project content onto the clear display 320. The projector 310 may direct light onto the clear display 320 using a projection lens. The projection lens may be positioned at least about 2 inches or at least about 4 inches from the clear display 320 and may be configured to project light at a grazing angle of about 70° relative to a central longitudinal axis of the clear display 320. Because the projector 310 may be a short throw projector, distance between the projection lens and the clear display 320 may be minimized, and positioning of the projector 310 with respect to the clear display 320 may be unobtrusive and aesthetically pleasing.

During use, the projector 310 may receive content and may project the content using light emitting diodes onto the clear display 320. The phosphor layers 326, 328, 330 of the clear display 320 may excite and render full color content. The phosphor layers 326, 328, 330 of the clear display 320 may have a relatively short excitation lifetime, and therefore blurring for videos or fast paced changes in content may not be visible during use of the mountable clear display and projection system 300.

Figure 4:
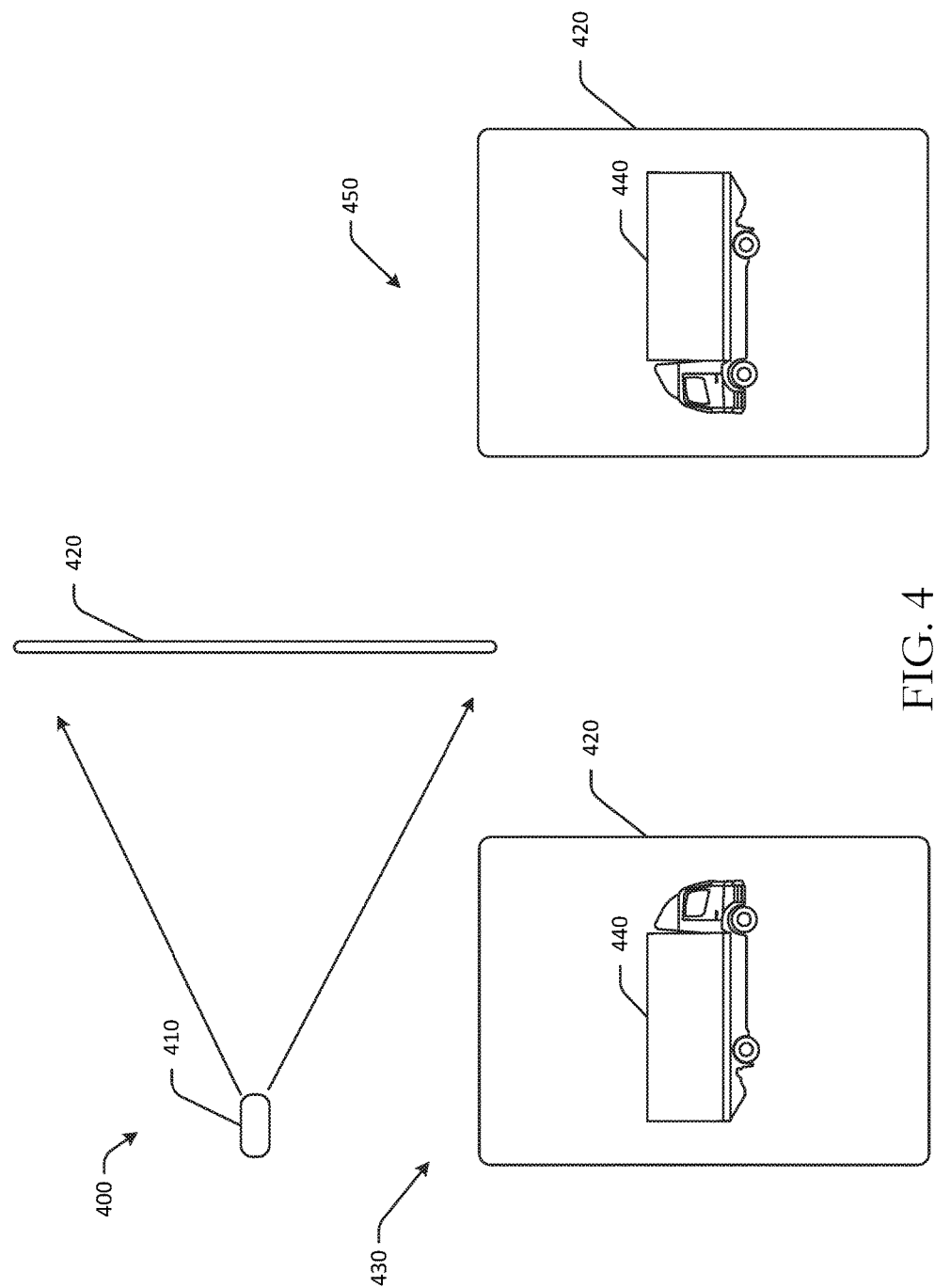
FIG. 4 is a schematic illustration of an example use case of a mountable clear display and projection system in accordance with one or more embodiments of the disclosure.

FIG. 4 illustrates a side view of an example mountable clear display and projection system 400 in accordance with one or more embodiments of the disclosure. The mountable clear display and projection system 400 includes a projector 410 and a clear display 420 hanging from a ceiling. The projection system 400 may be the same projection system as those illustrated in FIGS. 1-3.

In FIG. 4, the projector 410 may be positioned on one side of a hanging clear display 420. The hanging clear display 420 may hang from a ceiling or other structure, or may be positioned on top of a table or other structure. In some embodiments, the hanging clear display 420 may not be hanging, but may be supported from structure on the ground.

The projector 410 may project content onto a first side 430 of the hanging clear display 420. For example, in FIG. 4, an image or video of a truck 440 may be projected onto the hanging clear display 420. When viewed from the first side 430 of the hanging clear display 420, the truck 440 may appear in a first orientation.

Because the hanging clear display 420 is transparent, the truck 440 may also be visible from a second side 450 of the hanging clear display 420, where the second side 450 is opposite the first side 430 of the hanging clear display 420. However, when viewed from the second side 450, the truck 440 may be in a second orientation that is a mirror image of the first orientation, as depicted in FIG. 4. As a result, content can be consumed in color from both sides of the hanging clear display 420, and the hanging clear display 420 may appear invisible when not in use due to its clear nature.

Figure 5:
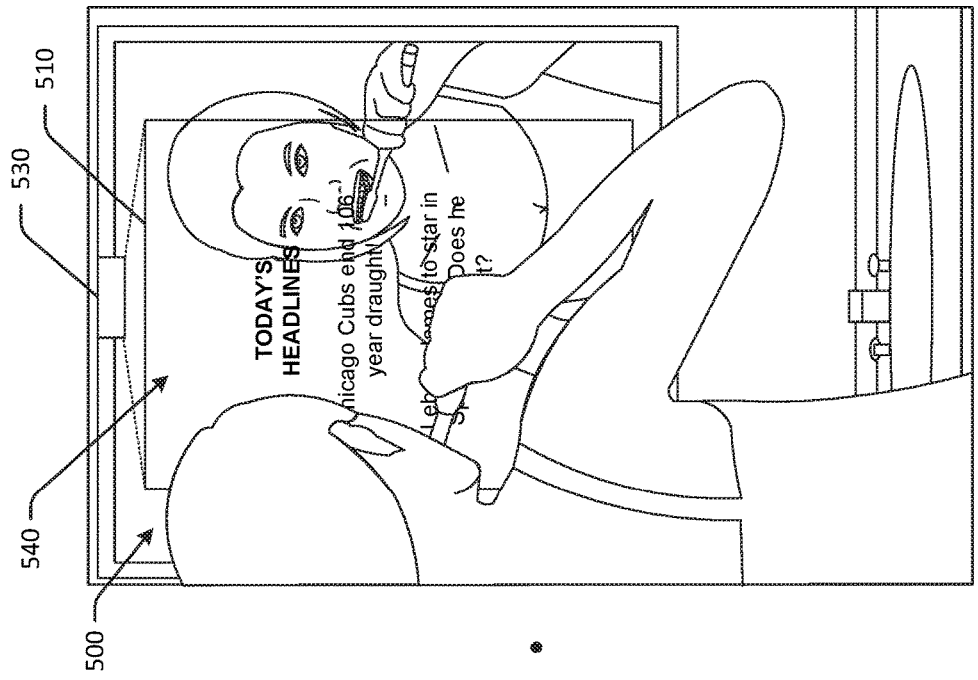
FIG. 5 is a schematic illustration of an example use case of a mirror-mounted clear display and projection system in accordance with one or more embodiments of the disclosure.
Figure 5:
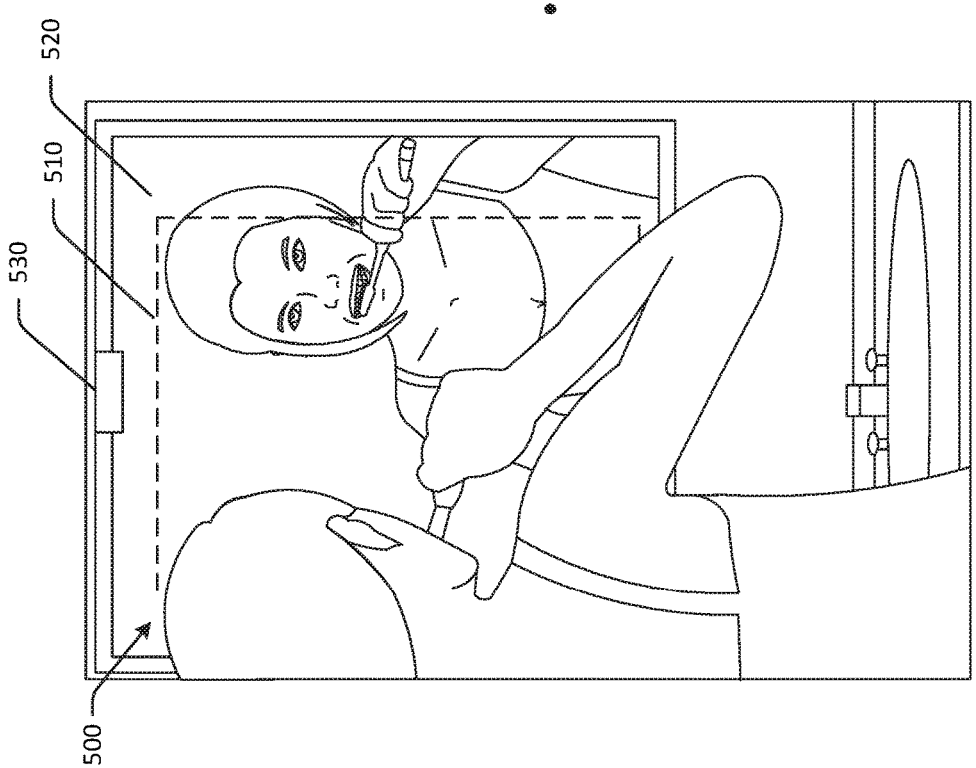

FIG. 5 illustrates an example mountable clear display and projection system 500, where a clear display 510 is mounted on a mirror surface 520 in accordance with one or more embodiments of the disclosure. The mountable clear display and projection system 500 includes a projector 530 and the clear display 510 mounted on the mirror surface 520. The projection system 500 may be the same projection system as those illustrated in FIGS. 1-4.

As depicted in FIG. 5, the mirror surface 520 may be any mirror surface, such as a bathroom mirror surface. The clear display 510 may be adhered, attached, or otherwise coupled to the mirror surface 520. The projector 530 may be positioned about the clear display 510, such as adjacent to an upper portion of the clear display 510. The projector 530 may be mounted to the mirror surface 520 or to a frame of the mirror surface or supporting structure.

When the projection system 500 is in an inactive state, as shown in FIG. 5, the mirror may be visible through the clear display 510 due to the transparent or clear nature of the clear display. As a result, the mirror may be used as normal without interruption.

The projection system 500 may be activated to project content onto the clear display 510 using the projector 530. The projector 530 may include a violet light emitting diode, an indigo light emitting diode, and a blue light emitting diode. As shown in FIG. 5, in an active state 550, the projector 530 may project content, such as current headlines, onto the clear display 510. The mirror surface 520 may be visible through the content, in some embodiments, while in other embodiments, the mirror surface 520 may not be visible in gaps through the content.

Content quality may be impacted by a thickness of the mirror surface 510. The mirror surface may include a glass portion and an aluminum portion. If the mirror glass portion is thicker than about 0.25 inches, for example, some doubling of the content or image may occur. To reduce doubling and/or to improve visibility of content, the clear display 510 may include a phosphor sheet with a green phosphor layer, a blue phosphor layer, and a red phosphor layer, as well as a blue light blocking layer coupled to the phosphor sheet. The blue light blocking layer may absorb escaped blue light before it is reflected by the mirror surface 520. The blue light blocking layer, or blue light absorbing layer, may be formed of plastic, such as a plastic film, and may be configured to absorb certain wavelengths or colors of light. The blue light blocking layer may be positioned in between the phosphor sheet of the clear display 510 and the mirror surface 520. The projected light may be intensified by the image light reflected from the aluminum portion of the mirror surface 520 and may intensify image resolution.

Figure 6:
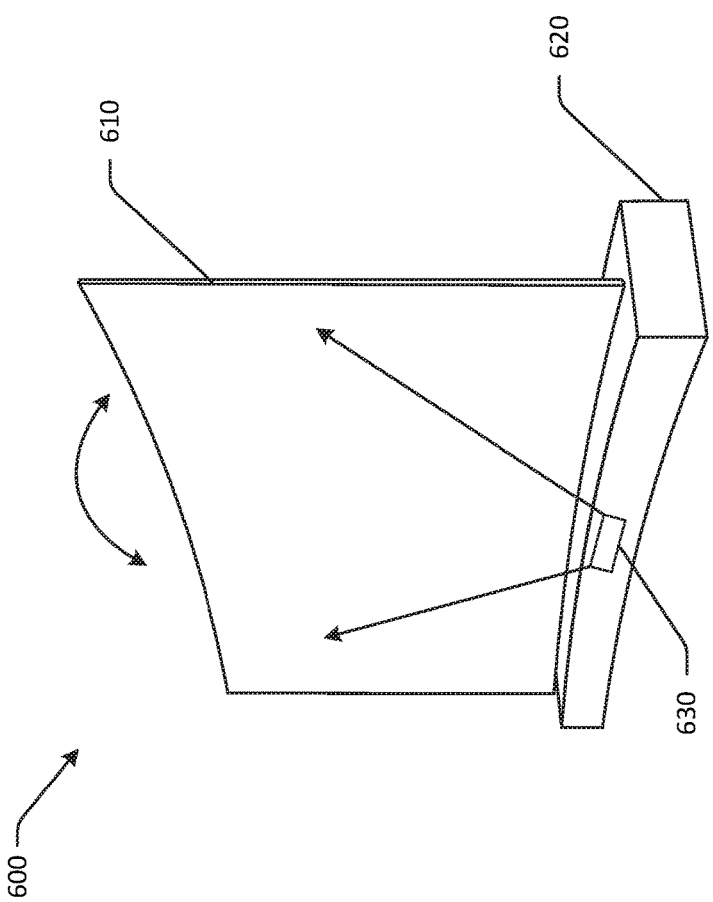
FIG. 6 is a schematic illustration of an example use case of a mountable clear display and projection system in accordance with one or more embodiments of the disclosure.

FIG. 6 illustrates an example mountable clear display and projection system 600, where a clear display 610 is mounted on a portable speaker device 620 in accordance with one or more embodiments of the disclosure. The mountable clear display and projection system 600 includes a projector 630 configured to project light onto the clear display 610. The projection system 600 may be the same projection system as those illustrated in FIGS. 1-5.

In FIG. 6, the clear display 610 may be formed with a curvature or curved radius, such that the clear display 610 acts a resonator for sound emitted from the wireless speaker device 620. For example, a speaker may produce sound directed towards the clear display 610, and the sound may resonate as a result of impacting the clear display 610.

The projector 630 may be configured to direct light, and therefore to project content, onto the clear display 610, such that content can be presented on the clear display 610 while the wireless speaker device 620 is producing sound. For example, song or music information, such as title or artist information, may be presented during playback of certain songs, weather information, news, images, videos, such as music videos, and other content may be presented on the clear display 610 using the projector 630.

The clear display 610 may be configured to rotate about the wireless speaker device 620, such as about a central axis of the wireless speaker device 620, so as to allow for various angles of visibility of content presented at the clear display 610. When in an inactive state, the clear display 610 may be unobtrusive due to its clear nature.

The wireless speaker device 620 may be a voice-activated consumer device, and the clear display 610 may serve as a visual display that blends with a room's ambience and style. The clear display 610 may be laminated with one or more phosphor sheets with different absorption and emission wavelengths. The projector 630 may be integrated into the wireless speaker device 620 or may be removably attached to the wireless speaker device 620. Light from the projector 630 in various violet or ultraviolet wavelengths (e.g., 405 nm, 425 nm, 450 nm, etc.) may excite fluorescence in the phosphors at blue, green, and red wavelengths to produce full color images or stills that appear to be suspended and are visible from any angle on the clear display 610. The clear display 610 may be configured to tilt back to reduce keystone distortion from a low angle of projection.

Figure 7:
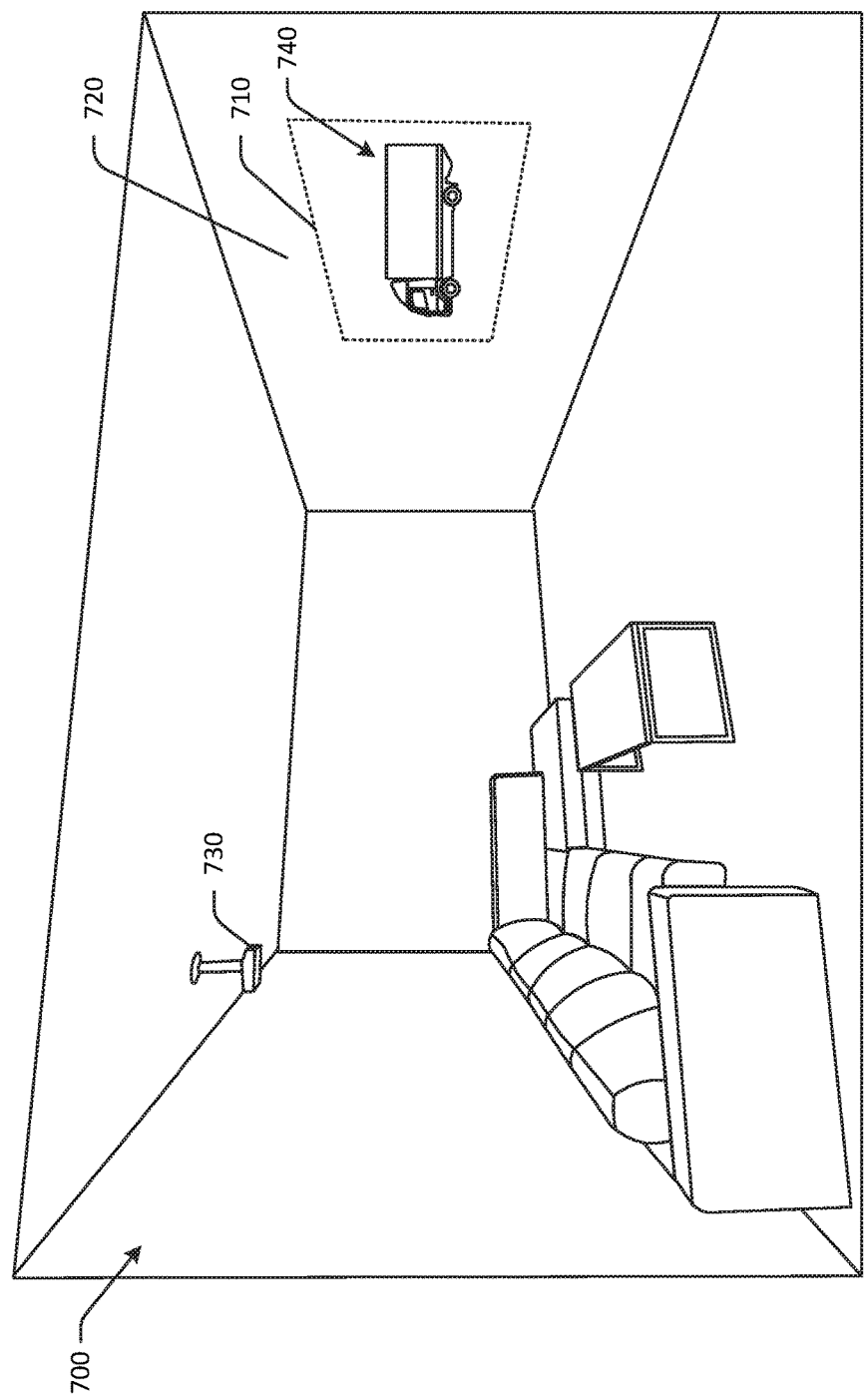
FIG. 7 is a schematic illustration of an example use case of an opaque surface-mounted clear display and projection system in accordance with one or more embodiments of the disclosure.

FIG. 7 illustrates an example mountable clear display and projection system 700, where a clear display 710 is mounted on an opaque surface 720, such as a painted wall, in accordance with one or more embodiments of the disclosure. The mountable clear display and projection system 700 includes a projector 730 that projects light onto the clear display 710 mounted on the opaque surface 720. The projection system 500 may be the same projection system as those illustrated in FIGS. 1-6.

Figure 8:
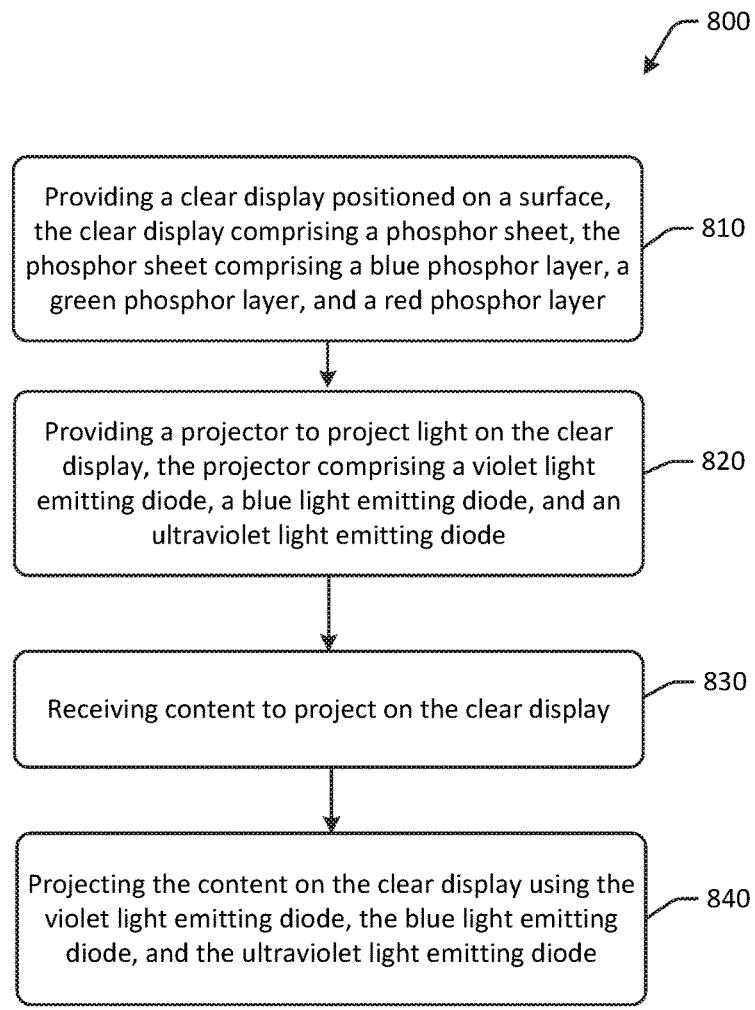
FIG. 8 is an example process flow in accordance with one or more example embodiments of the disclosure.

In FIG. 8, the clear display 710 may include only the phosphor sheet, with the green phosphor layer, the blue phosphor layer, and the red phosphor layer. The clear display 710 may be adhered or otherwise coupled to the opaque surface 720. In an active state 740, the projector 730 may project content onto the clear display 710, thereby causing content to be presented at the clear display 710. The projector 730 may be positioned adjacent to the clear display 710, or relatively farther away from the clear display 710 as depicted in FIG. 7. Accordingly, the projection system 700 may provide a convenient clear display 710 that can be used to consume content without bulky hardware or space consuming devices. In an inactive state, the natural color of the opaque surface 720 may be visible through the clear display 710.

FIG. 8 depicts an example process flow 800 for providing a mountable clear display and projection system in accordance with one or more example embodiments of the disclosure. The following operations may be performed in any order. Block 810 of the process flow includes providing a clear display positioned on a surface, the clear display comprising a phosphor sheet, the phosphor sheet comprising a blue phosphor layer, a green phosphor layer, and a red phosphor layer. Block 820 includes providing a projector to project light on the clear display, the projector comprising a violet light emitting diode, a blue light emitting diode, and an ultraviolet light emitting diode. Block 830 includes receiving content to project on the clear display. The content may be a color image, text, video, or other content. Block 840 includes projecting the content on the clear display using the violet light emitting diode, the blue light emitting diode, and the ultraviolet light emitting diode. In some embodiments, the process flow 800 may further include operations of projecting the content on the clear display using the violet light emitting diode, the blue light emitting diode, and the ultraviolet light emitting diode. Certain embodiments may include operations of detecting motion using a motion sensor, and activating the projector. For example, certain embodiments may include motion-activated projection systems that are initiated or triggered upon detecting motion.

It should be noted, that the process 800 may be modified in various ways in accordance with certain embodiments of the disclosure. For example, one or more operations of process 800 may be eliminated or executed out of the illustrated order in other embodiments of the disclosure. Additionally, other operations may be added to process 800 in accordance with other embodiments of the disclosure.

Illustrative Device Architecture

Figure 9:
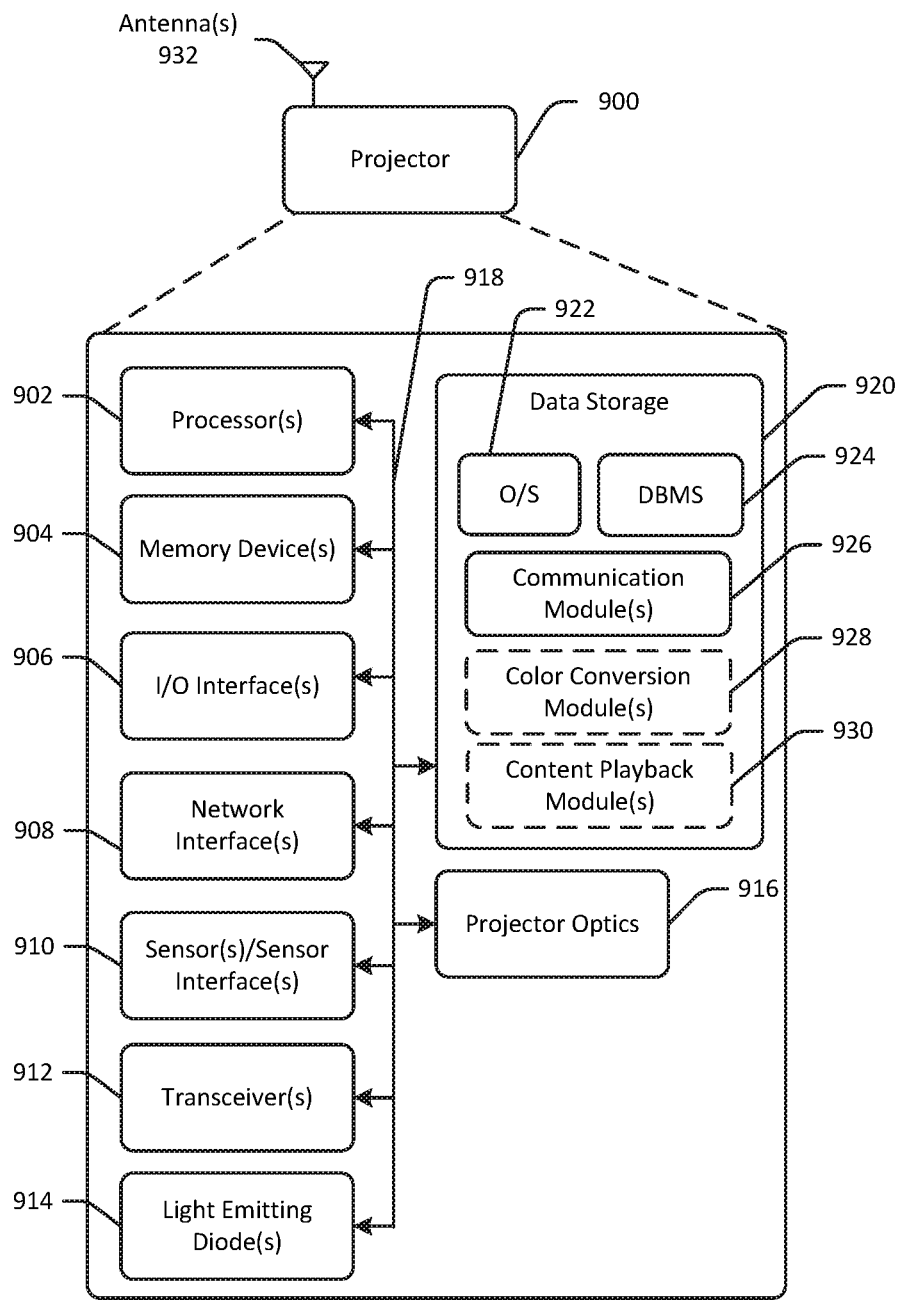
FIG. 9 is a schematic block diagram of an example projector in accordance with one or more example embodiments of the disclosure.

FIG. 9 is a schematic block diagram of an illustrative projector 900 in accordance with one or more example embodiments of the disclosure. The projector 900 may include or may be in communication with any suitable computing device including, but not limited to, a mobile device such as a smartphone, tablet, e-reader, wearable device, or the like; a desktop computer; a laptop computer; a content streaming device; a set-top box; or the like. The projector 900 may correspond to an illustrative device configuration for the projection devices or projectors of FIGS. 1-8.

The projector 900 may be configured to communicate via one or more networks, such as an Internet of Things network, with one or more servers, user devices, or the like. Such network(s) may include, but are not limited to, any one or more different types of communications networks such as, for example, Internet of Things networks, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the projector 900 may include one or more processors (processor(s)) 902, one or more memory devices 904 (generically referred to herein as memory 904), one or more input/output ("I/O") interface(s) 906, one or more network interface(s) 908, one or more sensors or sensor interface(s) 910, one or more transceiver(s) 912, one or more light emitting diode(s) 914, projector optics 916, and data storage 920. The projector 900 may further include one or more bus(es) 918 that functionally couple various components of the projector 900. The projector 900 may further include one or more antenna(e) 932 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 918 may include at least one of a system bus, a memory bus, an address bus, or a message bus, and may permit exchange of information (e.g., data (including computer-executable code), signaling, etc.) between various components of the projector 900. The bus(es) 918 may include, without limitation, a memory bus or a memory controller, a peripheral bus, an accelerated graphics port, and so forth. The bus(es) 918 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 904 of the projector 900 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 904 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 904 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 920 may include removable storage and/or non-removable storage including, but not limited to, magnetic storage, optical disk storage, and/or tape storage. The data storage 920 may provide non-volatile storage of computer-executable instructions and other data. The memory 904 and the data storage 920, removable and/or non-removable, are examples of computer-readable storage media (CRSM) as that term is used herein.

The data storage 920 may store computer-executable code, instructions, or the like that may be loadable into the memory 904 and executable by the processor(s) 902 to cause the processor(s) 902 to perform or initiate various operations. The data storage 920 may additionally store data that may be copied to memory 904 for use by the processor(s) 902 during the execution of the computer-executable instructions. Moreover, output data generated as a result of execution of the computer-executable instructions by the processor(s) 902 may be stored initially in memory 904, and may ultimately be copied to data storage 920 for non-volatile storage.

More specifically, the data storage 920 may store one or more operating systems (O/S) 922, one or more database management systems (DBMS) 924, and one or more program modules, applications, engines, computer-executable code, scripts, or the like such as, for example, one or more communication module(s) 926, one or more optional color conversion module(s) 928, and one or more optional content playback module(s) 930. Some or all of these modules may be sub-modules. Any of the components depicted as being stored in data storage 920 may include any combination of software, firmware, and/or hardware. The software and/or firmware may include computer-executable code, instructions, or the like that may be loaded into the memory 904 for execution by one or more of the processor(s) 902. Any of the components depicted as being stored in data storage 920 may support functionality described in reference to correspondingly named components earlier in this disclosure.

The data storage 920 may further store various types of data utilized by components of the projector 900. Any data stored in the data storage 920 may be loaded into the memory 904 for use by the processor(s) 902 in executing computer-executable code. In addition, any data depicted as being stored in the data storage 920 may potentially be stored in one or more datastore(s) (not shown) and may be accessed via the DBMS 924 and loaded in the memory 904 for use by the processor(s) 902 in executing computer-executable code. The datastore(s) may include, but are not limited to, databases (e.g., relational, object-oriented, etc.), file systems, flat files, distributed datastore(s) in which data is stored on more than one node of a computer network, peer-to-peer network datastore(s), or the like.

The processor(s) 902 may be configured to access the memory 904 and execute computer-executable instructions loaded therein. For example, the processor(s) 902 may be configured to execute computer-executable instructions of the various program modules, applications, engines, or the like of the projector 900 to cause or facilitate various operations to be performed in accordance with one or more embodiments of the disclosure. The processor(s) 902 may include any suitable processing unit capable of accepting data as input, processing the input data in accordance with stored computer-executable instructions, and generating output data. The processor(s) 902 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 902 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 902 may be capable of supporting any of a variety of instruction sets.

Referring now to functionality supported by the various program modules depicted in FIG. 9, the communication module(s) 926 may include computer-executable instructions, code, or the like that responsive to execution by one or more of the processor(s) 902 may perform functions including, but not limited to, sending and/or receiving information, such as receiving content information for presentation or projection on a clear display.

The optional color conversion module(s) 928 may include computer-executable instructions, code, or the like that responsive to execution by one or more of the processor(s) 902 may perform functions including, but not limited to, converting color information for content from a default color information to a modified color information based at least in part on the light emitting diode(s) and the related emission wavelengths available at the projector 900.

The content playback module(s) 930 may include computer-executable instructions, code, or the like that responsive to execution by one or more of the processor(s) 902 may perform functions including, but not limited to, initiating projection or presentation of content at the projector 900 onto a clear display.

Referring now to other illustrative components depicted as being stored in the data storage 920, the O/S 922 may be loaded from the data storage 920 into the memory 904 and may provide an interface between other application software executing on the projector 900 and hardware resources of the projector 900. More specifically, the O/S 922 may include a set of computer-executable instructions for managing hardware resources of the projector 900 and for providing common services to other application programs (e.g., managing memory allocation among various application programs). In certain example embodiments, the O/S 922 may control execution of one or more of the program modules depicted as being stored in the data storage 920. The O/S 922 may include any operating system now known or which may be developed in the future including, but not limited to, any server operating system, any mainframe operating system, or any other proprietary or non-proprietary operating system.

The DBMS 924 may be loaded into the memory 904 and may support functionality for accessing, retrieving, storing, and/or manipulating data stored in the memory 904 and/or data stored in the data storage 920. The DBMS 924 may use any of a variety of database models (e.g., relational model, object model, etc.) and may support any of a variety of query languages. The DBMS 924 may access data represented in one or more data schemas and stored in any suitable data repository. In certain example embodiments, the DBMS 924 may be any suitable light-weight DBMS optimized for performance on a mobile device.

Referring now to other illustrative components of the projector 900, the input/output (I/O) interface(s) 906 may facilitate the receipt of input information by the projector 900 from one or more I/O devices as well as the output of information from the projector 900 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the projector 900 or may be separate. The I/O devices may further include, for example, any number of peripheral devices such as data storage devices, printing devices, and so forth.

The I/O interface(s) 906 may also include an interface for an external peripheral device connection such as universal serial bus (USB), FireWire, Thunderbolt, Ethernet port or other connection protocol that may connect to one or more networks. The I/O interface(s) 906 may also include a connection to one or more of the antenna(e) 932 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The projector 900 may further include one or more network interface(s) 908 via which the projector 900 may communicate with any of a variety of other systems, platforms, networks, devices, and so forth. The network interface(s) 908 may enable communication, for example, with a wireless router, a host server, and/or one or more web servers via one or more network(s).

The antenna(e) 932 may include any suitable type of antenna depending, for example, on the communications protocols used to transmit or receive signals via the antenna(e) 932. Non-limiting examples of suitable antennas may include directional antennas, non-directional antennas, dipole antennas, folded dipole antennas, patch antennas, multiple-input multiple-output (MIMO) antennas, or the like. The antenna(e) 932 may be communicatively coupled to one or more transceivers 912 or radio components to which or from which signals may be transmitted or received.

As previously described, the antenna(e) 932 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 932 may additionally, or alternatively, include a Wi-Fi antenna configured to transmit or receive signals in accordance with established standards and protocols, such as the IEEE 802.11 family of standards, including via 2.4 GHz channels (e.g. 902.11b, 902.11g, 902.11n), 5 GHz channels (e.g. 902.11n, 902.11ac), or 60 GHZ channels (e.g. 902.11ad). In alternative example embodiments, the antenna(e) 932 may be configured to transmit or receive radio frequency signals within any suitable frequency range forming part of the unlicensed portion of the radio spectrum.

The antenna(e) 932 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 912 may include any suitable radio component(s) for—in cooperation with the antenna(e) 932—transmitting or receiving radio frequency (RF) signals in the bandwidth and/or channels corresponding to the communications protocols utilized by the projector 900 to communicate with other devices. The transceiver(s) 912 may include hardware, software, and/or firmware for modulating, transmitting, or receiving—potentially in cooperation with any of antenna(e) 932—communications signals according to any of the communications protocols discussed above including, but not limited to, one or more Wi-Fi and/or Wi-Fi direct protocols, as standardized by the IEEE 902.11 standards, one or more non-Wi-Fi protocols, or one or more cellular communications protocols or standards. The transceiver(s) 912 may further include hardware, firmware, or software for receiving GNSS signals. The transceiver(s) 912 may include any known receiver and baseband suitable for communicating via the communications protocols utilized by the projector 900. The transceiver(s) 912 may further include a low noise amplifier (LNA), additional signal amplifiers, an analog-to-digital (A/D) converter, one or more buffers, a digital baseband, or the like.

The sensor(s)/sensor interface(s) 910 may include or may be capable of interfacing with any suitable type of sensing device such as, for example, inertial sensors, force sensors, positioning sensors, thermal sensors, temperature sensors, humidity sensors, location sensors, and so forth. Example types of inertial sensors may include accelerometers (e.g., MEMS-based accelerometers), gyroscopes, and so forth.

The light emitting diode(s) 914 may be configured to emit light at one or more wavelengths, and at various colors. For example, the light emitting diode(s) may include one or more of a blue light emitting diode(s), an indigo light emitting diode(s), a violet light emitting diode(s), an ultraviolet light emitting diode(s), or another color and/or wavelength.

The projector optics 916 may include any suitable optics configured to project content from the projector 900. For example, the projector optics 916 may include one or more mirrors, one or more dichroic filters, one or more collectors/collimating lenses, one or more homogenizing optics (e.g., fly's eye array, etc.), one or more relay optics, one or more digital micromirror devices, one or more projection lens systems, and/or additional or fewer optics components.

It should be appreciated that the program modules, applications, computer-executable instructions, code, or the like depicted in FIG. 9 as being stored in the data storage 920 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the projector 900, and/or hosted on other computing device(s) accessible via one or more networks, may be provided to support functionality provided by the program modules, applications, or computer-executable code depicted in FIG. 9 and/or additional or alternate functionality. Further, functionality may be modularized differently such that processing described as being supported collectively by the collection of program modules depicted in FIG. 9 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 9 may be implemented, at least partially, in hardware and/or firmware across any number of devices.

It should further be appreciated that the projector 900 may include alternate and/or additional hardware, software, or firmware components beyond those described or depicted without departing from the scope of the disclosure. More particularly, it should be appreciated that software, firmware, or hardware components depicted as forming part of the projector 900 are merely illustrative and that some components may not be present or additional components may be provided in various embodiments. While various illustrative program modules have been depicted and described as software modules stored in data storage 920, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

One or more operations of the methods, process flows, and use cases of FIGS. 1-8 may be performed by a device having the illustrative configuration depicted in FIG. 9, or more specifically, by one or more engines, program modules, applications, or the like executable on such a device. It should be appreciated, however, that such operations may be implemented in connection with numerous other device configurations.

The operations described and depicted in the illustrative methods and process flows of FIGS. 1-8 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-8 may be performed.

Although specific embodiments of the disclosure have been described, one of ordinary skill in the art will recognize that numerous other modifications and alternative embodiments are within the scope of the disclosure. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A projection system comprising:
a mirror; and
a transparent display sheet adhered to the mirror, the transparent display sheet comprising:
 a blue phosphor layer that absorbs light having a first wavelength and emits light having a fourth wavelength of about 460 nm;
 a green phosphor layer that absorbs light having a second wavelength and emits light having a fifth wavelength of about 530 nm;
 a red phosphor layer that absorbs light having a third wavelength and emits light having a sixth wavelength of about 625 nm; and
a blue light blocking layer attached to the red phosphor layer of the transparent display sheet, the blue light blocking layer configured to absorb blue light passing through the transparent display sheet.

2. The mirror-based projection system of claim 1, further comprising:
a projector comprising:
 a first light emitting diode (LED) that outputs violet light having a first wavelength of about 405 nm, a second LED that outputs indigo light having a second wavelength of about 425 nm, and a third LED that outputs blue light having a third wavelength of about 450 nm;
 a beam splitter configured to split light having wavelengths equal to or greater than the first wavelength and less than or equal to the third wavelength; and
 a projection lens configured to direct light emitted from the projector;
 wherein the projection lens directs light from the projector to the transparent display sheet.

3. The projection system of claim 2, wherein the projector further comprises a fourth LED that outputs ultraviolet light.

4. The projection system of claim 1, further comprising:
a projector comprising:
 a first LED that outputs ultraviolet light having a first wavelength of about 380 nm, a second LED that outputs indigo light having a second wavelength of about 405 nm, and a third LED that outputs blue light having a third wavelength of about 425 nm;
 a beam splitter configured to split light having wavelengths equal to or greater than the first wavelength and less than or equal to the third wavelength; and
 a projection lens configured to direct light emitted from the projector;
 wherein the projection lens directs light from the projector to the transparent display sheet.

5. The projection system of claim 1, wherein the mirror comprises a glass portion and a reflective portion, and wherein the transparent display sheet is adhered to the glass portion.

6. The projection system of claim 1, wherein the blue phosphor layer is positioned between the green phosphor layer and the red phosphor layer.

7. The projection system of claim 1, further comprising an ultraviolet light blocking layer positioned between the transparent display sheet and the mirror.

8. A projection system comprising:
a mirror surface; and
a transparent display sheet adhered to the mirror surface, the transparent display sheet comprising:
 a blue phosphor layer that absorbs light having a first wavelength and emits light having a fourth wavelength of about 460 nm;
 a green phosphor layer that absorbs light having a second wavelength and emits light having a fifth wavelength of about 530 nm;
 a red phosphor layer that absorbs light having a third wavelength and emits light having a sixth wavelength of about 625 nm;
 wherein the blue phosphor layer is positioned between the green phosphor layer and the red phosphor layer; and
an ultraviolet light blocking layer attached to the red phosphor layer of the transparent display sheet.

9. The projection system of claim 8, further comprising:
a projector comprising:
 a first light emitting diode (LED) that outputs violet light having a first wavelength of about 405 nm, a second LED that outputs indigo light having a second wavelength of about 425 nm, and a third LED that outputs blue light having a third wavelength of about 450 nm;
 a beam splitter configured to split light having wavelengths equal to or greater than the first wavelength and less than or equal to the third wavelength; and a projection lens configured to direct light emitted from the projector;
wherein the projection lens directs light from the projector to the transparent display sheet.

10. The projection system of claim 9, wherein the projector further comprises a fourth LED that outputs ultraviolet light.

11. The projection system of claim 8, further comprising:
a projector comprising:
  a first LED that outputs ultraviolet light having a first wavelength of about 380 nm, a second LED that outputs indigo light having a second wavelength of about 405 nm, and a third LED that outputs blue light having a third wavelength of about 425 nm;
  a beam splitter configured to split light having wavelengths equal to or greater than the first wavelength and less than or equal to the third wavelength; and
  a projection lens configured to direct light emitted from the projector;
  wherein the projection lens directs light from the projector to the transparent display sheet.

12. The projection system of claim 8, further comprising: a first polarizer film adjacent to the red phosphor layer, a liquid crystal array layer adjacent to the first polarizer film, and a second polarizer film adjacent to the liquid crystal array layer.

13. The projection system of claim 8, further comprising an ultraviolet light blocking layer positioned between the transparent display sheet and the window surface.

14. The projection system of claim 8, further comprising an ultraviolet light blocking layer adjacent to the red phosphor layer.

15. A projection system comprising:
a glass surface;
a transparent display sheet adhered to the glass surface, the transparent display sheet comprising:
  a blue phosphor layer that absorbs light having a first wavelength and emits light having a fourth wavelength of about 460 nm;
  a green phosphor layer that absorbs light having a second wavelength and emits light having a fifth wavelength of about 530 nm;
  a red phosphor layer that absorbs light having a third wavelength and emits light having a sixth wavelength of about 625 nm, wherein the blue phosphor layer is positioned between the green phosphor layer and the red phosphor layer; and
a projector.

16. The projection system of claim 15, wherein the glass surface is a mirror surface, the projection system further comprising a blue light blocking layer attached to the red phosphor layer of the transparent display sheet, the blue light blocking layer configured to absorb blue light passing through the transparent display sheet.

17. The projection system of claim 15, wherein the glass surface is a window surface, the projection system further comprising an ultraviolet light blocking layer attached to the transparent display sheet.

18. The projection system of claim 15, wherein the projector comprises:
  a first light emitting diode (LED) that outputs violet light having a first wavelength of about 405 nm, a second LED that outputs indigo light having a second wavelength of about 425 nm, and a third LED that outputs blue light having a third wavelength of about 450 nm;
  a beam splitter configured to split light having wavelengths equal to or greater than the first wavelength and less than or equal to the third wavelength; and
  a projection lens configured to direct light emitted from the projector;
  wherein the projection lens directs light from the projector to the transparent display sheet.

19. The projection system of claim 15, wherein the projector comprises:
  a first LED that outputs ultraviolet light having a first wavelength of about 380 nm, a second LED that outputs indigo light having a second wavelength of about 405 nm, and a third LED that outputs blue light having a third wavelength of about 425 nm;
  a beam splitter configured to split light having wavelengths equal to or greater than the first wavelength and less than or equal to the third wavelength; and
  a projection lens configured to direct light emitted from the projector;
  wherein the projection lens directs light from the projector to the transparent display sheet.

20. The projection system of claim 15, wherein the projector comprises an LED that outputs ultraviolet light.

* * * * *